United States Patent Office 3,608,272
Patented Sept. 28, 1971

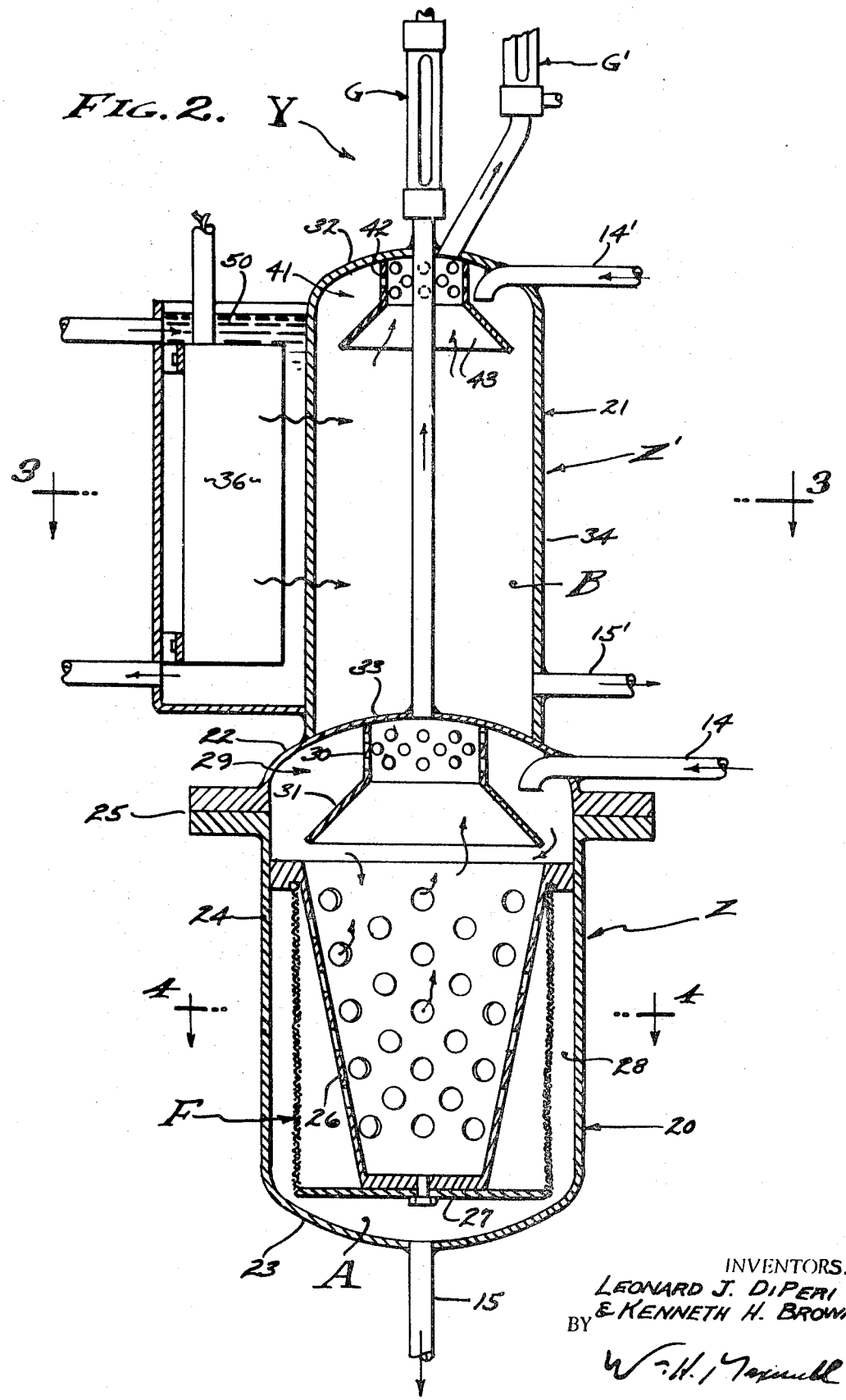

3,608,272
GAS FROM LIQUID SEPARATION METHOD AND APPARATUS
Leonard J. Di Peri, 18325 Lahey St., Northridge, Calif. 91324, and Kenneth H. Brown, Fullerton, Calif. (15005 SE. Robinett Court, Milwaukie, Oreg. 97222)
Filed Dec. 16, 1968, Ser. No. 783,850
Int. Cl. B01d 19/00, 51/08
U.S. Cl. 55—15                                9 Claims

ABSTRACT OF THE DISCLOSURE

Method and apparatus for the removal of gas from liquid, whereby substantially all absorbed and entrained gases are liberated and eliminated from hydraulic systems and preferably closed systems and the like; providing for the circulation of primary hydraulic system fluid with complementary hydraulic system fluid, and with the provision of a surface tension device that collects dimensionally large entrained gas bubbles; providing for separation from circulation of a body of fluid to be batch processed and replaced into circulation for commingling in said primary-complementary systems, and with the provision of vacuumization and sonic energy application to be applied to said separated batch of fluid whereby gas liberation therein is stimulated and the time required therefor reduced to a practical minimum; and providing for repeated batching and commingling until saturation becomes insignificantly small and acceptable as may be prescribed.

---

There are many instances in the practice of fluid dynamics where hydraulic systems, especially closed hydraulic systems, require the elimination of entrained gases that have developed and accumulated therein. Without theorizing upon the various sources of gas bubbles in hydraulic fluid, it is sufficient to accept the fact that gases are developed in and/or are admitted into closed hydraulic systems to the great disadvantage thereof. And, as a matter of mandatory practicality, there are such closed hydraulic systems which are rendered inoperable until or unless substantially all entrained gas is removed. For example, the otherwise relatively simple water-glycol cooling systems in spacecraft are plagued with entrained and entrapped pockets of gas, wherein the problem of gas elimination is at least two fold. That is, it is one matter to absorb and eliminate entrained gas bubbles and it is another matter to reach remote interstices and so called "dead ends" and also absorb and eliminate entrapped gas pockets. Heretofore, degasing of such systems has involved the expenditure of several months time before a satisfactory and acceptable gas saturation level was reached. On the contrary, the present invention reaches the same or equivalent gas saturation level within a few hours for each batch of fluid processed; and through the sequential and continued batch processing of liquid with a system and apparatus that purges with liquid substantially free of all gas, the absorption of entrapped gas is expedited so as to reach a satisfactory and acceptable gas saturation level within a day (approx.) as compared with several to six or eight weeks as previously required.

Prior art gas separation of the type under consideration has been characterized by filter units that collect entrained gases out of the liquid that is pumped therethrough. For example "surface tension" phenomenon is employed to advantage in the separation process and all of which is time consuming when the dimensions of the entrained gas bubbles is considered (extremely small). Consequently, extremely fine mesh screens are employed and through which the liquid flow is directed at a slow rate, of necessity. Alternately, the size of such filters can be increased but in which case the volume of the fluid handled becomes disproportionate and impractical. As a result, the capability of such systems is limited and the time required for their successful conclusion of gas elimination is extended into unreasonable periods as above indicated.

A known phenomenon is the filtering of gas from liquid by means of surface tension devices, it being the practice to remove entrained bubbles from the liquid. Further, it is known that vacuum pressures are advantageously applied so as to expedite the extraction of gas from liquid. Still further, sonic energy is known to be useful in accelerating the liberation of gas from liquid, whether absorbed or entrained as bubbles therein. However, the use of vacuum pressures and especially sonics in the liberation of gas from liquid has been restricted, for the most part to laboratory use, and has not been commercially exploited in gas separation of the type now under consideration. Therefore, it is a general object of this invention to remove absorbed and entrained gas from liquid in a closed hydraulic system, to purge the system to an acceptably desired gas saturation level, and all of which advantageously employs process steps and/or structural means for advantageously applying the laws of physics to the accomplishment of efficient liquid degasing.

It is an object of this invention to provide a method and apparatus that efficiently extracts gas from liquid through the combined physical effects of surface tension, of vacuum pressures, and of sonic energy, all of which are cooperatively combined to stimulate the liberation of absorbed and entrained gas and to collect entrained bubbles of gas, all while the primary system being treated remains closed with fluid circulating therethrough.

It is another object of this invention to provide a method and apparatus of the character thus far referred to that continuously removes the dimensionally larger entrainments of bubbles of gas from the primary system being treated while the absorbed and dimensionally smaller entrainments of gas, whether discernable as bubbles or not, are batch processed for efficient degasification to an acceptable gas saturation level and consequently commingled with the former dimensionally larger entrainment liquid until, by repeated batching and commingling, the proportionate difference in gas saturation becomes insignificantly small and for all practical purposes substantially equal to the said acceptable gas saturation level.

It is also an object of this invention to provide a method and apparatus of the character thus far referred to that supplements a primary hydraulic system with a compatible and complementary body of hydraulic fluid for circulation through said primary hydraulic system, and with provision for repeatedly separating a portion of said complementary body of hydraulic fluid therefrom for efficient batch processing and subsequent commingling in the primary hydraulic system.

It is still another object of this invention to provide a commercially practical machine or apparatus for the substantially complete degasification of liquid, regardless of the particular purpose of the primary system in which it is used and regardless of the chemical and/or physical properties of the liquid and/or gases treated and absorbed respectively. It is, therefore, to be understood that the present invention has its application in the general field of fluid dynamics and the particular reference to a particular coolant, namely water-glycol, is not to be construed as limiting.

The various objects and features of this invention will be fully understood from the following detailed description of the typical preferred form and application thereof, throughout which description reference is made to the accompanying drawings, in which:

FIG. 2 is a cross sectional elevation showing a preferred embodiment of the apparatus.

Figure 1:
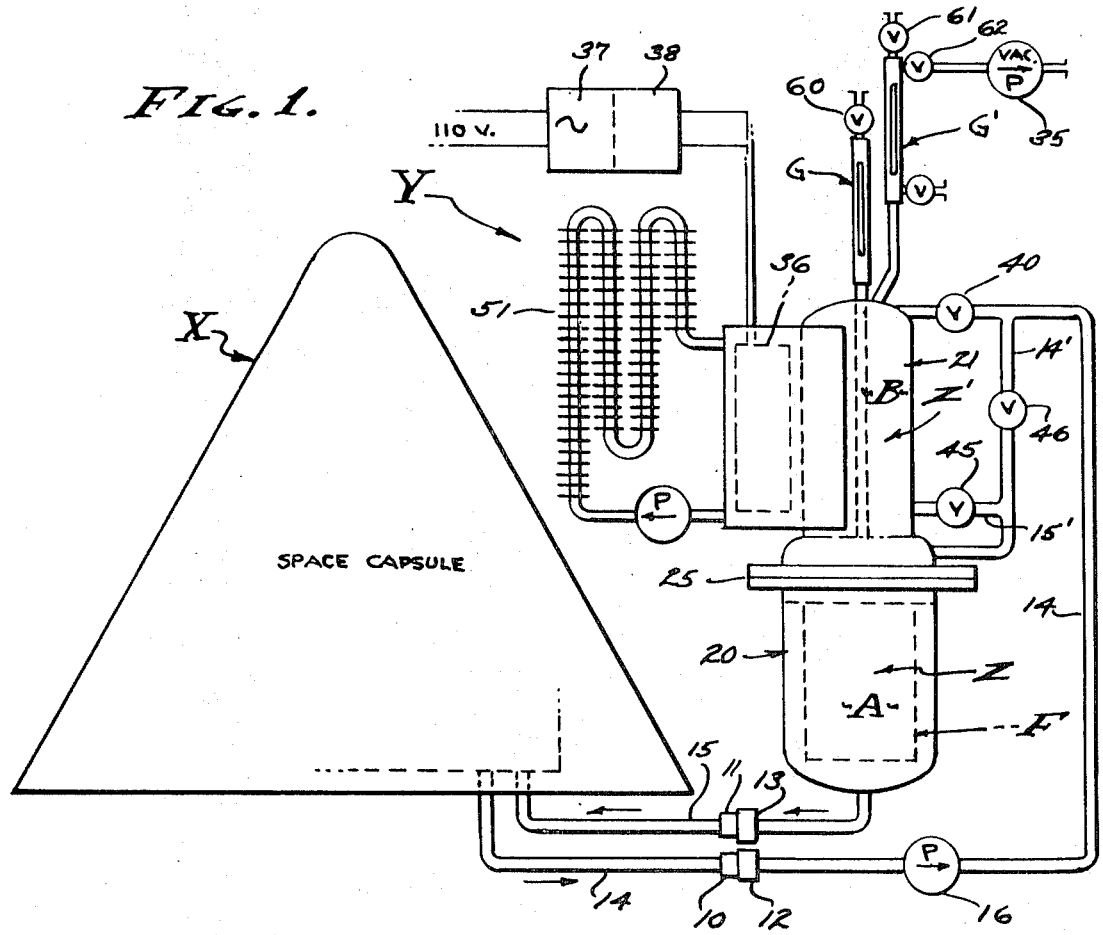
FIG. 1 is a diagrammatic view illustrating the method and apparatus herein disclosed.
Figure 3:
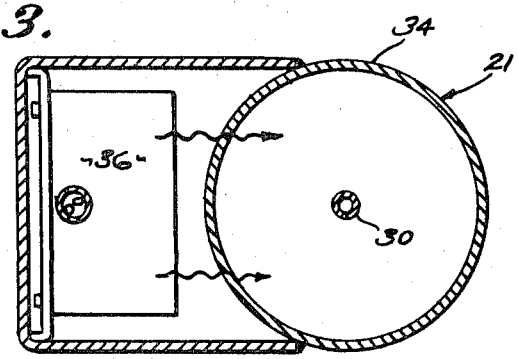
Figure 4:
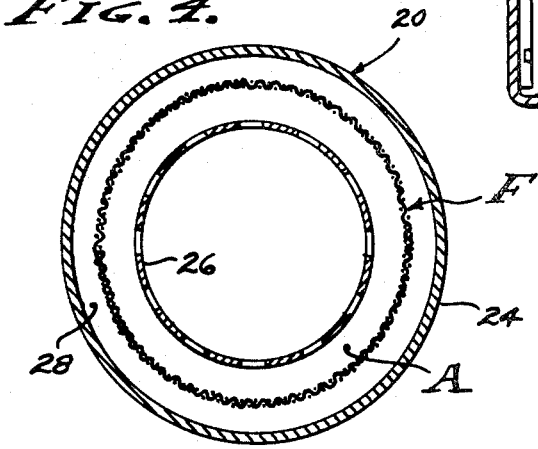

FIGS. 3 and 4 are sectional views taken as indicated by lines 3—3 and 4—4 on FIG. 2.

In the drawings we have shown a typical physical embodiment of the present invention wherein the method is carried out through the operation of a typical apparatus. Fundamentally, the practice of this invention involves a primary hydraulic system X which requires purging of the gas absorbed and/or entrained therein, a complementary hydraulic system Y which provides a complementary fluid for commingling with fluid in said primary hydraulic system, and a separation of the complementary hydraulic system Y into separate cooperatively related filter and liberating sections Z and Z'. The filter process involves the collection of the dimensionally larger entrainments of gas bubbles, while the liberating process involves the extraction and/or driving off and out of the liquid the dimensionally and/or infinitely smaller and absorbed gas. It is conceived that the method can be carried out by apparatus other than that described and claimed, for example elements of form other than cylindrical as shown, elements involving the artificial application of gravity, and involving inflatable membranes etc. Therefore, the method per se is as follows:

The primary hydraulic ssytem X can vary widely with the one limitation that it is a closed system through which liquid circulates. For example, a cooling system wherein the coolant is water-glycol. With such a system (indicated diagrammatically) of pumps, valves, chamber, tubes and like passages, various possible areas of fluid entrapment or dead end areas are unavoidable. Depending upon the disposition or attitude of the equipment involved, these dead end areas do exist and are a source of difficulty when purging such a system, and it is the liquid to fluid and/or gas to fluid interfaces presented by these dead end areas or pockets of gas or fluid with which the present invention is particularly concerned, in addition to the general presence of entrained gas bubbles throughout the body of liquid carried and circulated throughout the system.

In accordance with the invention the method is practiced by firstly coupling a complementary hydraulic system charged with compatible fluid in series with the primary hydraulic system in which the fluid is to be treated, and by permitting fluid circulation under pressure through the two systems. The coupling of the two systems is executed with the exclusion of any surrounding atmosphere. Secondly, the fluid is filtered for the collection of dimensionally larger entrainments of gas as and when the fluid passes through the complementary hydraulic system, and the gas filtered therefrom is extracted as it is accumulated. In practicing the method, the phenomenon of surface tension is employed by passing the fluid through a suitable surface tension device that prevents the passage therethrough of said dimensionally larger entrainments as gas which are in the form of bubbles that coalesce and accumulate for ease of extraction. Thirdly, a body of fluid is separated from the supplementary hydraulic system and subjected to vacuumization and exposed to sonic energy for the liberation of dimensionally and infinitely smaller entrainments and absorbed gas, and the gas liberated therefrom is extracted as it is accumulated. The application of sonic energy can vary and in practice it is the exposure of fluid to ultrasonic vibration which is practiced, for example vibration frequencies in the range of 16 to 19.5 kilocycles per second, and in which case heat is generated and which is absorbed by a suitable cooling system. Discriminate application of this heat is advantageously employed in the fluid being treated. And fourthly, the said body of fluid separated from the complementary hydraulic system and liberated of dimensionally and infinitely smaller entrapments and absorbed gas is released into the coupled primary and complementary hydraulic systems to commingle therein and thereby reduce the gas saturation level therein. In practice, the subjection of sonic energy is discontinued and the vacuumization is necessarily discontinued during said fourth step, wherein the degased liquid is returned into and commingled with the fluid in the primary and complementary hydraulic systems. The entire process is preferably performed with the exclusion of surrounding atmospheric gases, the collection of gas from the complementary fluid system being extracted by virtue of the pressure operation, for example 70 p.s.i., in the primary hydraulic system; and the liberation of gas from the separated fluid body being extracted by virtue of and during the vacuumization and/or by and during open communication with the pressurized hydraulic system.

In accordance with the invention the machine or apparatus involves, generally, the complementary hydraulic system Y and its filter section Z and liberating section Z'. As above described, the primary hydraulic system X operates under pressure, 70 p.s.i. and includes outlet and inlet coupling connections 10 and 11. Although not shown, the system X is a complete unity in itself all as circumstances require, including circulation means etc. For example, the connections 10 and 11 are of the self-closing umbilical type, which permits quick connection and disconnection to the exclusion of the surrounding atmosphere. Therefore, the complementary hydraulic system Y includes inlet and outlet coupling connections 12 and 13 mateable with the connections 10 and 11 respectively, whereby an inlet line 14 extends from within and an outlet line 15 extends into the system X. As indicated, a pump 16 is provided for the circulation and processing of the fluid through the systems.

In accordance with the invention the correlated filter section Z and liberating section Z' are embodied in tank-like structures that establish suitable processing chambers A and B respectively. In each instance, fluid circulation is continued through the chambers which are capable of withstanding positive and negative pressures as will be described. For example, subjection of the primary hydraulic system to positive or negative pressure and the subjection of the section Z' to vacuumization, all as related to surrounding atmospheric pressure, is taken into consideration. Therefore, the sections Z and Z' are characterized by pressure vessels 20 and 21, the filter section Z and its vessel 20 being series connected with lines 14 and 15 to receive fluid and its entrainments from the primary hydraulic system X and to deliver fluid less entrainments into the primary hydraulic system X; the liberating section Z' and its vessel 21 being parallel connected to the system Y and preferably to line 14 in order to receive a batch of fluid and its entrainments for processing and subsequent return into the system Y (and system X) less entrainments.

Referring now to the filter section Z and its vessel 20, it is the larger entrainments that are sought to be collected and removed from circulation and to this end the chamber A of the vessel 20 is a coalescing chamber that advantageously employs a surface tension screen F. Essentially, the surface tension screen F is an ultra fine mesh partition through which all liquid must pass as it flows into and out of the chamber. In practice, the mesh or gradient of the surface tension screen F is such that liquid being processed will readily pass therethrough while entrainments such as foreign particles and particularly gas bubbles will not pass therethrough. Consequently, there is a coalescence of gas bubbles at and on the upstream side of the surface tension screen F and to the end that minute bubbles of gas merge with each other to form and establish increasingly larger gas bubbles which subsequently reach sizeable enough proportion relative to the viscosity of the fluid to rise according to the laws of displacement. Therefore in carrying out the invention, the surface tension screen F is disposed so that coalesced gases that accumulate thereon are permitted to separate and rise therefrom and collect in their upward rise. In this respect to disposition and upward rise, it is to be understood that the application of artificial gravity is contemplated in place of earth's gravitational pull.

Referring now to the structure of the filter section Z and vessel 20, the chamber A is vertically disposed, with a head 22, a bottom 23 and an adjoining cylindrical side 24, all of which are imperforate for the establishment of chamber A. In order for accessibility the head 22 is connected by means of a flanged joint 25 to the side 24. The upper portion of chamber A is upstream and is supplied from inlet line 14, while the lower portion of chamber A is downstream and is exhausted into outlet line 15. Accordingly, the surface tension screen F is disposed across the chamber A and is preferably an inverted downwardly tapered truncated cone or cylinder of fine mesh metallic woven fabric, secured at its upper base periphery to the side 24 and reinforceably held in shape by a framework 26. The framework 26 is shown as a perforated cone that rigidly depends from the base of the screen F to the truncated bottom end 27 thereof. In practice, the base of the screen F is sealed with the side 24, thereby isolating an annulus 28 at the exterior of the screen and which is in open communication with the outlet line 15.

The inlet line 14 enters into open communication with the upper portion of chamber A, discharging therein at the exterior of a diffuser 29. The diffuser 29 is centrally located at the uppermost extremity of chamber A and comprises a tube 30 of substantially lesser cross section than that of vessel 20 and depending from the head 22, and further comprises a baffle 31 projecting radially from the tube and into close proximity to side 24. In practice, the perimeter of baffle 31 overlies the base perimeter of the surface tension screen F, so that the coalesced bubbles that rise are directed, as by funneling, into the tube 30. In order to maintain a separation of inlet fluid from the collection of gas within the tube 30 and to avoid collection of gas outside the diffuser, the tube 30 is perforated immediately adjacent the head 22, and the inlet line 14 opens at and onto the top exterior of the baffle 31 well below said perforation.

With the apparatus as thus far described the first and second steps of the method are carried out for the collection and elimination of dimensionally larger entrainments of gas. It is to be understood that the magnitude of the entrainment gas removed, the dimensional largeness, is dependent upon the fineness of the surface tension screen F; and it is to be recognized that there are dimensionally smaller and/or absorbed entrainments of gas that will and do pass through the filter section Z. Consequently, filter section Z has for its purpose the removal of gas bubbles and prevention of discernably large entrainments passing through and into the primary hydraulic system X.

Referring now to the liberating section Z' and its vessel 21, it is the dimensionally and infinitely smaller entrainments and absorbed gas that are sought to be collected and removed from circulation, and to this end the chamber B of the vessel 21 is a generating chamber that advantageously employs vacuumization and/or sonic energy to generate gas from fluid therein. The vacuumization is applied by means of a typical vacuum pump 35 as indicated diagrammatically and the degree of vacuum can vary. However, the greater the vacuum the more efficient is the gas generation, and consequently a sizeable and efficient pump 35 is employed. The sonic energy is applied by means of a transducer 36 energized by a high frequency generator 37 and electronic amplifier 38. The generator and amplifier 37–38 is commercially available, and it is ultrasonic energy that is particularly advantageous in liberating gas from fluid. In practicing this invention "ultrasonic" frequencies of from 16 to 19.5 kilocycles are utilized. Thus, there are two general forces for liberation of the gas within chamber B of the liberating section Z', vacuumization and sonic energy application and either or both of which are applied to the enhancement of the other. That is, both forces independently cause liberation of gas from fluid, but the application of both forces causes the rapid and efficient liberation of gas and including the liberation of the dimensionally and infinitely smaller and absorbed gas entrained in the fluid. Therefore, we will describe the invention as it includes both vacuumization and sonic energy application, and to the end that a most efficient gas generation is accomplished in the chamber B.

Briefly, the chamber B is essentially a closed chamber that is filled with fluid to be processed and in practice with a portion of the chamber reserved for the accumulation of gas generated therein, and which is related to the vibration applicating transducer 36 that transmits sonic energy into the fluid body contained therein. The minute and/or absorbed gas will literally boil out of the fluid solution and thereby form and establish a gas pocket at the portion of the chamber reserved therefor and leave substantially pure liquid within the chamber B.

With respect to the generation of gas within chamber B there is an upward rise of coalescing gas and in which case the vessel 21 is vertically disposed, with a head 32, a bottom 33 and an adjoining cylindrical side 34, all of which are imperforate for the establishment of chamber B. The upper portion of chamber B is upstream and is supplied from inlet line 14 while the lower portion of chamber B is downstream and is exhausted into the upstream portion of chamber A. It is to be understood that other connection arrangements can be made, however the connection shown places the chamber B in parallel with the flow in line 14 so that all fluid passes through the filter section Z, for the security of removing sizeable entrainments.

The inlet 14 has a branch 14' controlled by a valve 40 and which opens into the upper portion of chamber B, discharging therein at the exterior of a diffuser 41. The diffuser 41 is centrally located at the uppermost extremity of chamber B and comprises a tube 42 of substantially lesser cross section than that of vessel 21 and depending from the head 32, and a baffle 43 projecting radially therefrom and into close proximity to the side 34 so that the coalesced bubbles are directed, as by funneling, into the tube 42. In order to maintain a separation of inlet fluid from the collection of gas within the tube 42 and to avoid collection of gas outside the diffuser, the tube 42 is perforated immediately adjacent the head 32 and the inlet line 14' opens at and onto the baffle 43 well below said perforation.

The outlet from chamber B is through a branch line 15' controlled by a valve 45 and which opens into the line 14 downstream from the branch 14'. And, intermediate the branches 14' and 15' the line 14 is provided with a valve 46. As shown, the line 15' exhausts from the lowermost extremity of vessel 21, and the valves 40, 45 and 46 are manually and individually operable opening and closing valves. However, it is contemplated that the said valves can be simultaneously operable through a single lever system, or alternately combined together as a single valve unit that handles the three separate flow channels as indicated. By closing valves 40 and 45 and by opening valve 46, circulation parallels the chamber B in vessel 21 and passes only through the chamber A in vessel 20. Alternately, by closing valve 46 and by opening valves 40 and 45, circulation is through the chamber B in vessel 21 and continues through the chamber A in vessel 20.

The sonic energy unit of the apparatus involves the transducer 36 that is applied to the vessel 21 of the gas liberating section Z'. In practice, the transducer 36 is mounted at the side 34 and disposed to focus and/or direct wave energy transversely of the vessel 21 and fluid within chamber B. The ultrasonic generator 37 and amplifier 38 can be remotely positioned as circumstances require and the operation of the transducer will generate some heat.

Since temperature range of the transducer is limited, and because of the expanse of the side area and/or full elevation to which sonic energy is to be applied, the transducer is immersed in a fluid coolant 50 which is jacketed so as to embrace 180° of side 34, and that is circulated and heat transferred therefrom as by a heat radiating exchanger 51. The coolant 50 provides the media for energy transfer to the side of the vessel 21 and which penetrates side 34 and through the fluid therein, and also provides the media for removing heat generated by operation of the transducer.

With the apparatus now fully described, the third and fourth steps of the method are carried out for the liberation and elimination of dimensionally smaller and absorbed entrainments of gas. The liberating system Z' has for its purpose the batch processing of a body of fluid that is diverted into chamber B and held separated from the primary hydraulic system X and filtering system section Z'. The diversion and separation is accomplished by operation of the valves 40, 45 and 46 as above described, and to the end that a multiplicity of bodies of fluid are consecutively batch processed in the chamber B while fluid circulation continues in and through the filter chamber A and primary system X. A feature of the method and apparatus is the continuance of the filtering function during the batch processing which liberates gas to a low saturation level, for example to a .003% gas to liquid saturation. Another feature is the continued accumulation of gas in both chambers A and B, and from each of which gas is extractable from the systems at any time. As shown, the extraction of gas from chambers A and B is from the uppermost portions thereof, said portions being reserved for collection and extraction or exhaust of accumulated gas.

There are various ways in which to detect the presence of such gas bodies, such as use of liquid level sensing devices, and thereby determinably control the exhaust of gas, such as by maintaining a liquid level with a sensing device as suggested. However, a basic manual system is illustrated and wherein sight gages G and G' are provided at sections Z and Z', in communication with the gas collecting tubes 30 and 42 respectively. In the embodiment shown, the head 22 of vessel 20 is integral with and common to the bottom 33 of vessel 21, in which case the tube 30 is extended vertically through the chamber 21 and carries the gage G immediately above the head 32 and adjacent the gage G' (substantially side by side) the latter gage being directly carried immediately above the head 32 by the tube 42. In any case, the sight gages G and G' are in open communication with the gas collecting tubes 30 and 42 and to the end that the level of liquid or position of the gas to liquid interface is determinable. Therefore, as and when the gas accumulates to lower the liquid level it is possible to extract gas from the tops of the gages G and G'. Therefore, valves 60 and 61 are provided at the upper extremity of each gage respectively for said gas extraction, whereby collected and liberated gases are eliminated from the systems X and Y. Further, when vacuumization is employed as is shown in the preferred form of the invention, and when the primary hydraulic system X is operated under the pressure indicated, it is our practice to provide a vacuum shut-off valve 62 for isolating the gage G' and vacuum pump 35 from the systems X and Y while the chamber B is being charged and/or evacuated with the liquid under said pressure. Also, said shut-off valve 62 is employed to charge the systems X and Y with complementary and/or compatible liquid when and as circumstances require in order to maintain fullness with the liquid being processed.

Having described only a typical preferred form and application of our invention, we do not wish to be limited or restricted to the specific details herein set forth, but wish to reserve to ourselves any modifications or variations that may appear to those skilled in the art.

Having described our invention, we claim:

1. The method of treating continuously circulating fluid having gas entrained therein and for the removal of said gas from liquid therein and including the steps, of stopping the flow of entrained gas bubbles by means of surface tension, of coalescing said stopped gas bubbles into a first pocket of gas and collecting the same thereby lowering the gas saturation level in said circulating liquid, and of separating a body of fluid being treated out of circulation for batch processing comprising subjection of said body of fluid to vacuumization for the removal of entrained and absorbed gas by coalescing thereof into a second pocket of gas and collecting the same, thereby lowering the gas saturation level in said body of fluid to render it liquid, subsequently returning said body of liquid into circulation for commingling with the continuously circulating fluid being treated, and subsequently extracting gas from said first and second mentioned pockets thereof.

2. The method of treating fluid as set forth in claim 1 and including the step of exposure of said body of fluid to sonic energy for the removal of entrained and absorbed gas by coalescing thereof into the said second mentioned pocket of gas.

3. The method of treating fluid as set forth in claim 1 and including the step of exposure of said body of fluid to ultrasonic wave energy for the removal of entrained and absorbed gas by coalescing thereof into the said second mentioned pocket of gas.

4. The method of treating gas entrained continuously circulating fluid flowing through a closed primary hydraulic system and for the removal of said gas from liquid therein and including the steps, of coupling a closed complementary hydraulic system charged with compatible fluid to the first mentioned system in series with respect to circulation through the two systems, of stopping the flow of entrained gas bubbles in the complementary system by means of surface tension, of coalescing said stopped gas bubbles into a first pocket of gas in said complementary system and collecting the same thereby eliminating entrained gas and lowering the gas saturation level in said circulating liquid in the primary hydraulic system, and of separating a body of fluid out of the second mentioned complementary hydraulic system and out of circulation for batch processing comprising subjection of said body of fluid to vacuumization for the removal of entrained and absorbed gas by coalescing thereof into a second pocket of gas in said complementary system and collecting the same thereby lowering the gas saturation level in said body of fluid to render it liquid, subsequently returning said body of liquid into circulation for commingling with the continuously circulating fluid being treated, and subsequently extracting gas from said first and second mentioned pockets thereof.

5. The method of treating gas entrained fluid in a closed primary hydraulic system as set forth in claim 4 and including the step of exposure of said body of fluid to sonic energy for the removal of entrained and absorbed gas by coalescing thereof into the said second mentioned pocket of gas in said complementary system.

6. The method of treating gas entrained fluid in a closed primary hydraulic system as set forth in claim 4 and including the step of exposure of said body of fluid to ultrasonic wave energy for the removal of entrained and absorbed gas by coalescing thereof into the said second mentioned pocket of gas in said complementary system.

7. An apparatus for the treatment of gas entrained continuously circulating fluid flowing through a primary hydraulic system and for removal of said gas from liquid therein, and comprising a complementary hydraulic system to be charged with compatible fluid and for coupled circulatory engagement with the primary hydraulic system in series with respect to circulation through the two systems, and said complementary hydraulic system including a filter section vessel with an inlet from the primary system and an outlet to the primary system and having a surface tension screen intermediate the inlet and outlet stopping the flow of entrained gas in the form of bubbles to coalesce at the inlet side of the screen and having a gas collecting tube with a valve therein to be opened for extracting the accumulation of gas, and including a gas liberating section vessel with an inlet from the primary system and an outlet to the primary system, means separating fluid in the gas liberating section vessel from fluid in the primary section, there being a vacuum means opening into the vessel, and having a gas collecting tube surrounding the opening of the vacuum means and with a valve therein to be opened for extracting the accumulation of gas.

8. The apparatus for the treatment of gas entrained fluid as set forth in claim 7 and wherein a sonic force means exposes wave energy into fluid in the gas liberating section vessel.

9. The apparatus for the treatment of gas entrained fluid as set forth in claim 7 and wherein ultrasonic force means exposes wave energy into fluid in the gas liberating section vessel.

References Cited

UNITED STATES PATENTS

| | | | |
|---|---|---|---|
| 2,147,677 | 2/1939 | Smith | 55—55X |
| 2,363,247 | 11/1944 | Holder | 55—15X |
| 3,273,313 | 9/1966 | Livesey et al. | 55—55X |

REUBEN FRIEDMAN, Primary Examiner

R. W. BURKS, Assistant Examiner

U.S. Cl. X.R.

55—43